US012580812B2

(12) United States Patent
Yamasaki et al.

(10) Patent No.: US 12,580,812 B2
(45) Date of Patent: Mar. 17, 2026

(54) COMMUNICATION CONTROL DEVICE, COMMUNICATION CONTROL METHOD, AND NON-TRANSITORY COMPUTER READABLE RECORDING MEDIUM

(71) Applicant: TOYOTA JIDOSHA KABUSHIKI KAISHA, Toyota (JP)

(72) Inventors: Yasuhiro Yamasaki, Nisshin (JP); Kunihiro Miyauchi, Toyota (JP); Hideki Goto, Okazaki (JP); Ikuyoshi Otake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/171,775

(22) Filed: Feb. 21, 2023

(65) Prior Publication Data

US 2023/0291647 A1    Sep. 14, 2023

(30) Foreign Application Priority Data

Mar. 10, 2022    (JP) ................................. 2022-037511

(51) Int. Cl.
| | |
|---|---|
| *H04L 41/082* | (2022.01) |
| *H04L 41/0659* | (2022.01) |
| *H04L 41/0813* | (2022.01) |
| *H04L 41/0859* | (2022.01) |
| *H04L 41/122* | (2022.01) |
| *H04L 67/00* | (2022.01) |

(52) U.S. Cl.
CPC ........ *H04L 41/082* (2013.01); *H04L 41/0661* (2023.05); *H04L 41/0813* (2013.01); *H04L 41/0863* (2013.01); *H04L 41/122* (2022.05); *H04L 67/34* (2013.01)

(58) Field of Classification Search
CPC . H04L 41/082; H04L 41/0661; H04L 41/122; H04L 41/0663; H04L 41/0863; H04L 41/0836; H04L 41/40; H04L 41/0816; H04L 41/0813; H04L 41/06; H04L 43/0823; H04L 67/34
See application file for complete search history.

(56) References Cited

U.S. PATENT DOCUMENTS

| | | | | |
|---|---|---|---|---|
| 2016/0381055 | A1* | 12/2016 | Galula .................... | H04L 63/14 726/23 |
| 2019/0034191 | A1* | 1/2019 | Fox ......................... | G06F 21/57 |
| 2019/0034256 | A1* | 1/2019 | Fox ......................... | G06F 9/445 |

(Continued)

FOREIGN PATENT DOCUMENTS

| | | |
|---|---|---|
| JP | 2017-169044 A | 9/2017 |
| WO | WO 2020/241473 A1 | 12/2020 |

*Primary Examiner* — Patrice L Winder
(74) *Attorney, Agent, or Firm* — Oblon, McClelland, Maier & Neustadt, L.L.P.

(57) ABSTRACT

A communication control device includes a memory and a processor connected to the memory. The processor is configured to perform processing related to changing a network setting, on a communication device that is connected to the network and that is a setting change target, and perform processing to return the network setting to a prior state, on the communication device that is the setting change target, in a case in which a communication abnormality notification is received from a communication device that is connected to the network and that is not a setting change target.

10 Claims, 6 Drawing Sheets

(56)                    References Cited

U.S. PATENT DOCUMENTS

| | | | |
|---|---|---|---|
| 2020/0050442 A1* | 2/2020 | Sakurai | H04W 4/48 |
| 2020/0174779 A1* | 6/2020 | David | H04L 67/34 |
| 2020/0272455 A1* | 8/2020 | Mezaael | H04W 4/40 |
| 2021/0072975 A1* | 3/2021 | Khafagy | H04L 67/34 |
| 2021/0165649 A1* | 6/2021 | Harata | H04W 4/44 |
| 2021/0288801 A1* | 9/2021 | Kulkarni | H04L 9/0631 |
| 2022/0024471 A1* | 1/2022 | Itatsu | G06F 11/07 |
| 2022/0204008 A1* | 6/2022 | Kogure | G06F 9/3001 |
| 2023/0267776 A1* | 8/2023 | Yano | G07C 5/0808 |
| | | | 701/29.1 |
| 2023/0396634 A1* | 12/2023 | Fang | H04L 63/1416 |

* cited by examiner

FIG.1

COMMUNICATION CONTROL DEVICE, COMMUNICATION CONTROL METHOD, AND NON-TRANSITORY COMPUTER READABLE RECORDING MEDIUM

CROSS-REFERENCE TO RELATED APPLICATION

This application is based on and claims priority under 35 USC 119 from Japanese Patent Application No. 2022-37511 filed on Mar. 10, 2022, the disclosure of which is incorporated by reference herein.

BACKGROUND

Technical Field

The present disclosure relates to a communication control device, a communication control method, and a non-transitory computer readable recording medium.

Related Art

Use is proliferating of software defined networking (SDN) to change the configuration of a network by software setting, without changing the hardware configuration. For example, a setting device disclosed in JP-A No. 2017-169044 activates a network while also imparting a setting update to a communication device configuring the network.

After the settings of the network have been changed, sometimes a communication device that is connected to the network and that was not the setting change target detects a communication abnormality irrespective of communication actually being normal.

SUMMARY

An aspect of the disclosure is a communication control device including a memory, and a processor coupled to the memory. The processor is configured to perform processing related to changing a network setting, on a communication device that is connected to the network and that is a setting change target, and perform processing to return the network setting to a prior state, on the communication device that is the setting change target, in a case in which a communication abnormality notification is received from a communication device that is connected to the network and that is not a setting change target.

BRIEF DESCRIPTION OF THE DRAWINGS

Exemplary embodiments of the present disclosure will be described in detail based on the following figures, wherein:

FIG. 1 is a diagram illustrating an example of a schematic configuration of a communication system according to a present exemplary embodiment;

DETAILED DESCRIPTION

Figure 2:
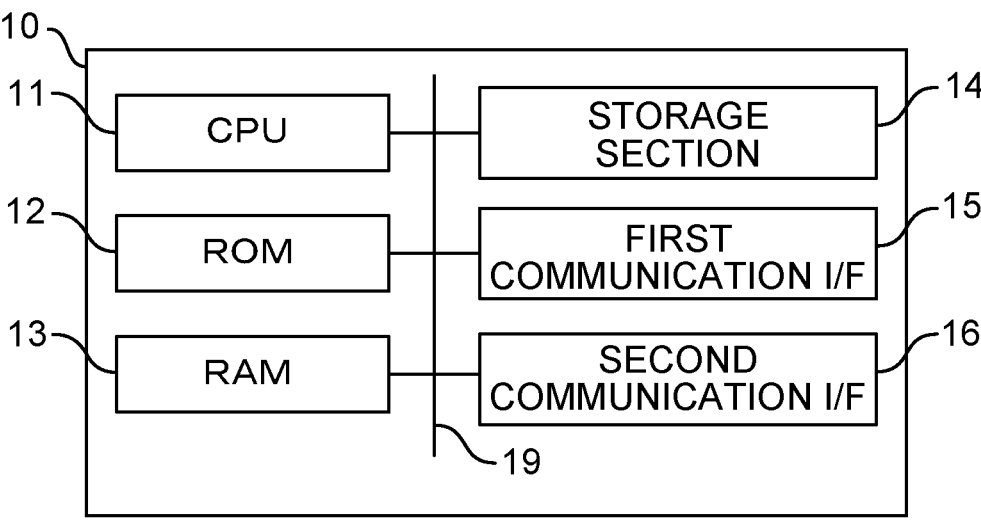
FIG. 2 is a block diagram illustrating an example of a hardware configuration of an ECU.

Explanation follows regarding an example of an exemplary embodiment of the present disclosure, with reference to the drawings. Note that the same reference numerals will be appended to the same or equivalent configuration elements and parts in each of the drawings. Sometimes the proportional dimensions in the drawings are exaggerated for explanation purposes and differ from actual proportions.

Figure 1:
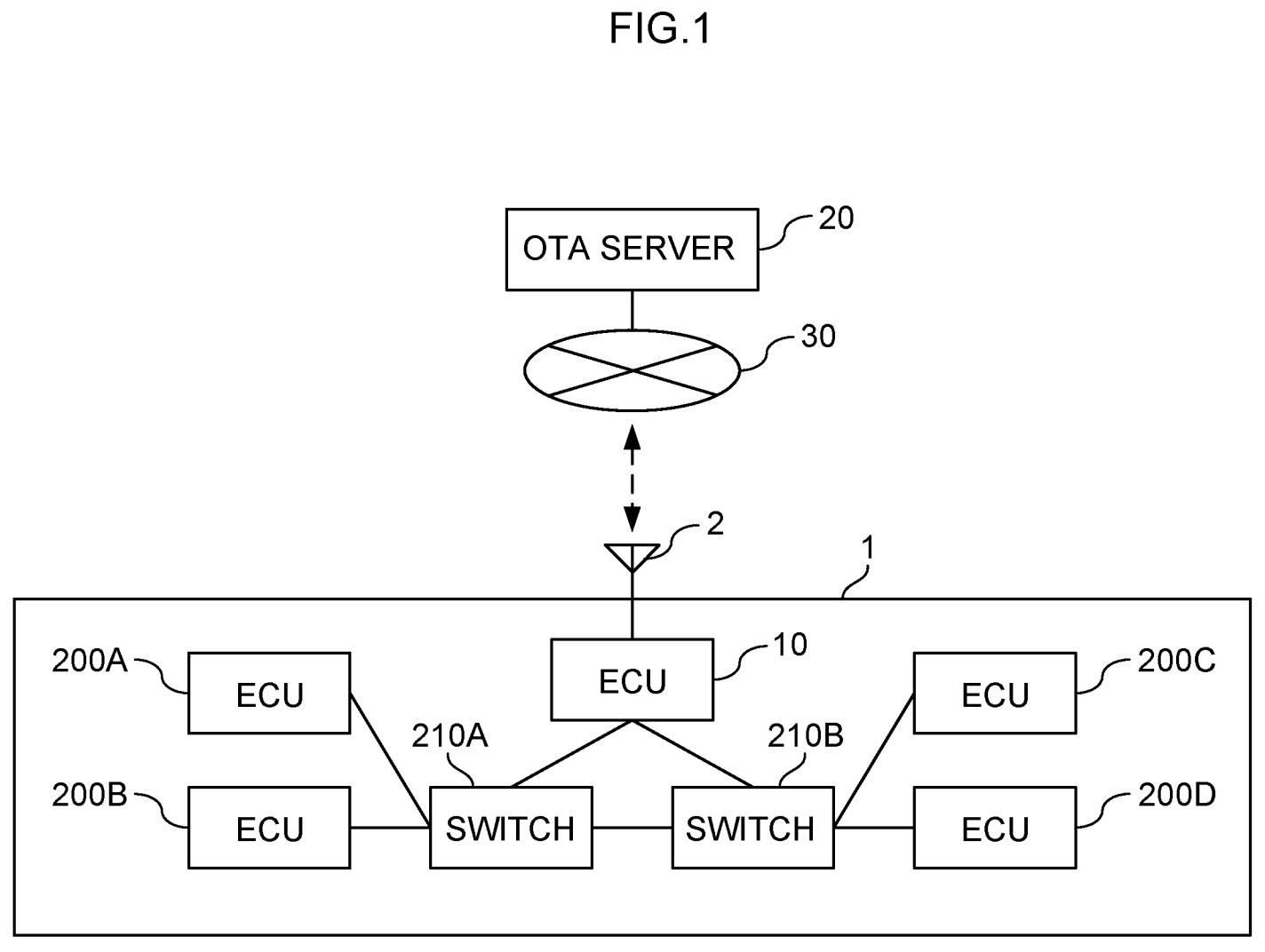

FIG. 1 is a diagram illustrating an example of a schematic configuration of a communication system according to the present exemplary embodiment. The communication system illustrated in FIG. 1 has a configuration in which a vehicle 1 and an over the air (OTA) server 20 are connected together over a network 30. The vehicle 1 includes an antenna 2, and an onboard network that is an example of a network of the present disclosure and includes electronic control units (ECU) 10, 200A, 200B, 200C, 200D, and switches 210A, 210B. The ECUs 10, 200A, 200B, 200C, 200D and the switches 210A, 210B are connected together by an Ethernet (registered trademark). Note that the numbers of the ECUs and switches are not limited to those of the example illustrated in FIG. 1, and the connection configuration of the ECUs and switches is also not limited to that of the example illustrated in FIG. 1.

The ECU 10 is an ECU to perform overall control of the onboard network. The ECU 10 performs communication with the OTA server 20 using the antenna 2, and exchanges various data with the OTA server 20. The ECUs 200A, 200B, 200C, 200D are each ECUs for controlling each section of the vehicle 1. For example, the ECUs 200A, 200B, 200C, 200D control operation of equipment installed to the vehicle 1 such as an engine, a motor, brakes, a camera, lights, and the like.

The ECU 10 changes a configuration of the onboard network by software setting using SDN technology, without changing the hardware configuration of the onboard network. Namely, to change the onboard network configuration, the ECU 10 operates the switches 210A, 210B by software control using OpenFlow or the like, without plugging and unplugging cables or individually setting the individual switches 210A, 210B. More specifically, the ECU 10 sets addresses of packets sent from each ECU to the switches 210A, 210B by software control. The switches 210A, 210B let packets pass or destroy packets based on the content set by the ECU 10.

The OTA server 20 is a server for updating software for each of the ECUs of the vehicle 1. In cases in which an update has been produced for the software stored in each of the ECUs of the vehicle 1, the updated software is transmitted from the OTA server 20 to the vehicle 1. To update the software stored on each of the ECUs of the vehicle 1, the software may be transmitted automatically from the OTA server 20 to the vehicle 1, or the software may be transmitted from the OTA server 20 to the vehicle 1 under instruction from a user onboard the vehicle 1.

When an update has been produced for the software of an ECU connected to the onboard network, sometimes there is an instruction by the updated software to perform new communication with a different ECU of the onboard network. For example, as a result of updating the software on the ECU 200A, sometimes the ECU 200A may be configured to start new communication with the ECU 200C via the switches 210A, 210B. The ECU 10 changes the communication settings of the switches 210A, 210B when a software update has been produced for an ECU connected to the onboard network.

However, there is a possibility that, as a result of updating the software, an ECU might detect the new communication as a communication abnormality, such as a communication error or an external attack. For example, consider a case in which the ECU 200D that was set so as to only communicate with the ECU 10 and the ECU 200C, and to detect all data from other ECUs as an abnormality and report this to the ECU 10. In such cases, when data from the ECU 200A arrives at the ECU 200D as a result of the communication settings of the switches 210A, 210B being changed, the ECU 200D detects the data transmitted from the ECU 200A as an abnormality and reports this abnormality to the ECU 10.

To address this issue when, as a result of the change in communication settings of the switches 210A, 210B by the software, the ECU 10 according to the present exemplary embodiment acquires a report of an abnormality from an ECU that is not a communication setting change target, the ECU 10 returns the communication settings of the switches 210A, 210B to the state prior to change. The ECU 10 then instructs the OTA server 20 to roll back the software. Thus when the ECU 10 according to the present exemplary embodiment acquires the abnormality report from the ECU connected to the onboard network, the ECU 10 is accordingly able to stop this ECU detecting the abnormality by returning the communication settings of the switches 210A, 210B to the state prior to change.

Explanation follows regarding a hardware configuration of the ECU 10. FIG. 2 is a block diagram illustrating an example of a hardware configuration of the ECU 10.

As illustrated in FIG. 2, the ECU 10 includes a central processing unit (CPU) 11, read only memory (ROM) 12, random access memory (RAM) 13, storage 14, a first communication interface (I/F) 15, and a second communication interface 16. Each configuration element is connected together through a bus 19 so as to enable mutual communication therebetween.

The CPU 11 is an example of a hardware processor, and is a central processing unit that executes various programs and controls each section. Namely, the CPU 11 reads a program from the ROM 12 or the storage 14, which are each an example of a non-transitory recording medium, and executes the program using the RAM 13, which is an example of memory, as a workspace. The CPU 11 performs control of each of the configuration elements described above and performs various computation processing according to the program recorded on the ROM 12 or the storage 14. In the present exemplary embodiment a communication control program for performing communication control of the onboard network of the vehicle 1 is stored on the ROM 12 or the storage 14.

The ROM 12 stores various programs and various data. The RAM 13 serves as workspace for temporarily storing programs or data. The storage 14 is an example of a non-transitory recording medium and is configured by a storage device such as flash memory or the like, and is stored with various programs including an operating system and various data.

The first communication interface 15 is an interface for communicating with the OTA server 20 by employing, for example, a wireless communication standard such as 4G, 5G, or Wi-Fi (registered trademark). The second communication interface 16 is an interface for communicating with other equipment such as the ECUs 200A to 200D by employing, for example, a wired communication standard such as Ethernet (registered trademark).

When the above communication control program is executed, the ECU 10 implements various functions using the above hardware resources. Explanation follows regarding a functional configuration implemented by the ECU 10.

Figure 3:
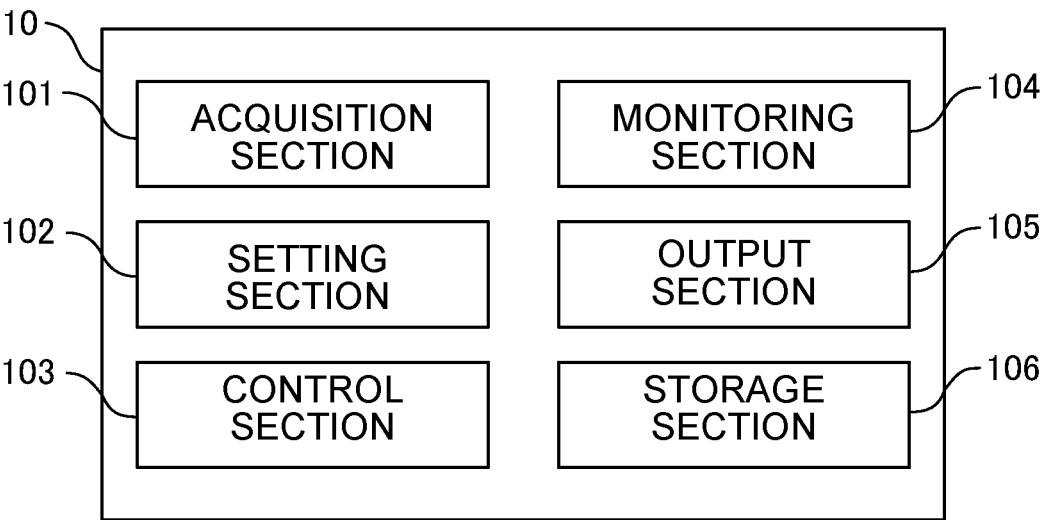
FIG. 3 is a block diagram illustrating an example of a functional configuration of an ECU.

FIG. 3 is a block diagram illustrating an example of a functional configuration of the ECU 10.

As illustrated in FIG. 3, the ECU 10 includes functional configuration of an acquisition section 101, a setting section 102, a control section 103, a monitoring section 104, an output section 105, and a storage section 106. Each of these functional configuration elements is implemented by the CPU 11 reading the communication control program stored on the ROM 12 or the storage 14 and executing the communication control program. Note that the functions of the acquisition section 101, the setting section 102, the control section 103, the monitoring section 104, the output section 105, and the storage section 106 may be implemented by plural ECUs.

The acquisition section 101 acquires data from the OTA server 20 and from the ECUs 200A to 200D of the onboard network. More specifically, when an update has been produced for software executed by the ECUs 200A to 200D, the acquisition section 101 acquires the new software from the OTA server 20. Moreover, the acquisition section 101 also acquires data for changing the communication settings of the switches 210A, 210B when needed in response to the software update of the ECUs 200A to 200D.

The setting section 102 performs onboard network communication setting using software. For example, the setting section 102 changes the communication settings of the switches 210A, 210B when needed in response to the software update of the ECUs 200A to 200D. Namely, the setting section 102 changes the onboard network configuration by software setting. Changing the communication settings performed by the setting section 102 is, for example, performed by setting a path so as to enable communication with a communication partner ECU 200, setting to open or close a port, setting to prioritize passage of a packet, setting the size of a packet queue, setting a bandwidth, or setting packet filtering. For example, in cases in which the ECU 200D has been newly added to the onboard network, the setting section 102 might perform setting on the other ECUs 200A to 200C that perform communication with the ECU 200D and perform setting on the switches 210A, 210B to enable communication with the ECU 200D.

The switches 210A, 210B hold the communication settings in a table format, for example. The switches 210A, 210B reference the table for the processing of frames or packets flowing on the onboard network.

The control section 103 controls the operation of the ECU 10 and controls the onboard network. More specifically, the control section 103 performs control to cause the new software acquired by the acquisition section 101 to be output to the output section 105 when an update has been produced for software executed on the ECUs 200A to 200D. When needed in response to the software update of the ECUs 200A to 200D, the control section 103 performs control on the switches 210A, 210B to cause output from the output section 105 of the data needed for communication setting change processing in the setting section 102.

The monitoring section 104 monitors the communication state in the onboard network. More specifically, the monitoring section 104 monitors whether or not the detection of a communication abnormality has been notified from any of the ECUs connected to the onboard network.

The output section 105 outputs data to the OTA server 20 and to each of the devices in the onboard network. The output of the data from the output section 105 is performed under control from the control section 103.

The storage section 106 stores various information, such as information referenced when operating the ECU 10 and information employed to control the onboard network. More specifically, in cases in which a communication abnormality has been detected in an ECU of the onboard network after the communication settings of the switches 210A, 210B have been changed, the storage section 106 is stored with the communication settings prior to change in order to return the communication settings to the original state.

There is a possibility that a communication abnormality might be detected in one of the ECUs on the onboard network after the communication settings of the switches 210A, 210B have been changed accompanying performing a software update on at least one of the ECUs 200A to 200D. On confirmation of being notified that a communication abnormality has been detected, the monitoring section 104 notifies the control section 103 that there is an ECU 200 issuing a communication abnormality present in the onboard network. The control section 103 requests the OTA server 20 to roll back the updated software and to return to the software prior to update when confirmed that, due to update of the software and change to the communication settings, there is now an ECU 200 issuing a communication abnormality present in the onboard network. Then, on receipt of a rollback instruction from the OTA server 20, the control section 103 reads the communication settings prior to change that is being stored in the storage section 106, and performs controls to return the communication settings of the switches 210A, 210B to the original state.

The control section 103 may determine that a change to the settings of the onboard network is effective in cases in which notification of a communication abnormality from the ECUs 200 has not been received for a specific period of time from when the onboard network settings were changed for the switches 210A, 210B. The control section 103 may then notify the OTA server 20 that the change to the onboard network was effective. The OTA server 20 is able to ascertain that the software update has completed normally by acquiring the notification that the change to the onboard network was effective from the vehicle 1.

The ECU 10 includes the configuration illustrated in FIG. 3, and so in cases in which a communication abnormality has been detected in an ECU of the network that was not a network setting change target, the ECU 10 is able to return the communication settings of the switches 210A, 210B that were the network setting change target to the communication settings prior to change. By returning to the communication settings prior to change for these switches 210A, 210B, the ECU 10 is able achieve a configuration in which a communication abnormality is not being detected by the ECUs that are not the network setting change target.

Figure 4:
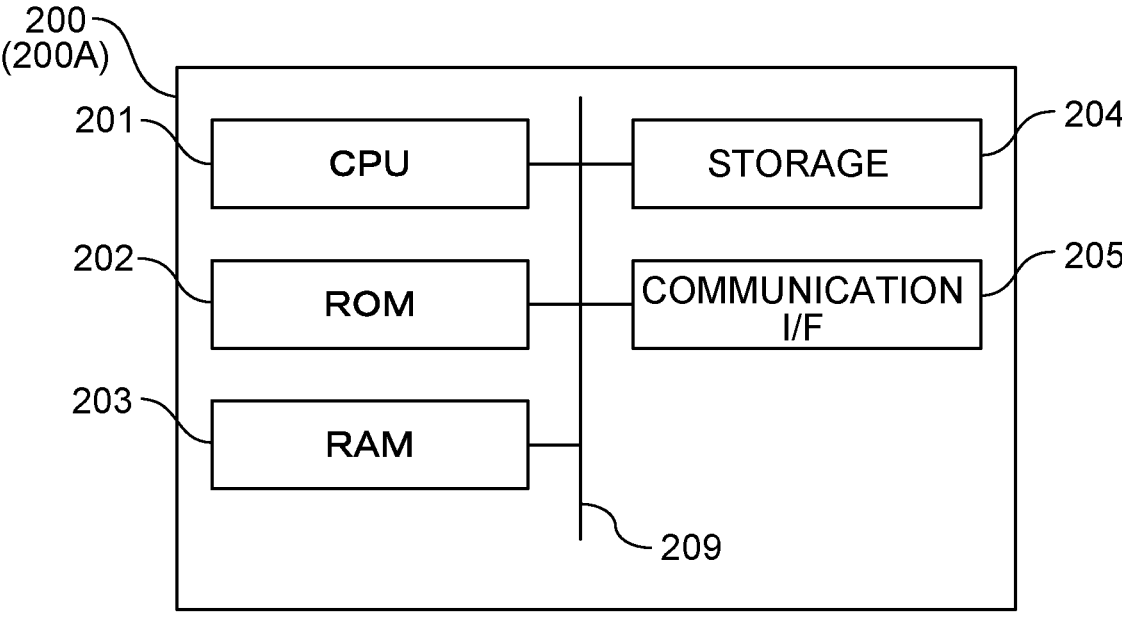
FIG. 4 is a block diagram illustrating an example of a hardware configuration of an ECU.

Explanation next follows regarding a hardware configuration of the ECUs 200A to 200D. In the following the ECUs 200A to 200D are referred to collectively as the ECUs 200. FIG. 4 is a block diagram illustrating a hardware configuration of one of the ECUs 200.

As illustrated in FIG. 4, the ECUs 200 each include a CPU 201, ROM 202, RAM 203, storage 204, and a communication interface (I/F) 205. The configuration elements are connected together through a bus 209 so as to be able to communicate with each other.

The CPU 201 is an example of a hardware processor and is a central processing unit that executes various programs and controls each section. Namely, the CPU 201 reads a program from the ROM 202 or the storage 204, which are each an example of a non-transitory recording medium, and executes the program using the RAM 203, which is an example of memory, as a workspace. The CPU 201 performs control of each of the configuration elements described above and performs various computation processing according to the program recorded on the ROM 202 or the storage 204.

The ROM 202 stores various programs and various data. The RAM 203 is an example of a workspace and temporarily stores programs or data. The storage 204 is configured by a storage device such as flash memory or the like, and is stored with various programs including an operating system and various data.

The communication interface 205 is an interface for communicating with other equipment such as the ECU 10 and other ECUs 200 by employing, for example, a wired communication standard such as Ethernet (registered trademark).

In order to execute the communication control program described above, the ECU 200 uses the above hardware resources to implement various functions. Explanation follows regarding the functional configuration implemented by the ECU 200.

Figure 5:
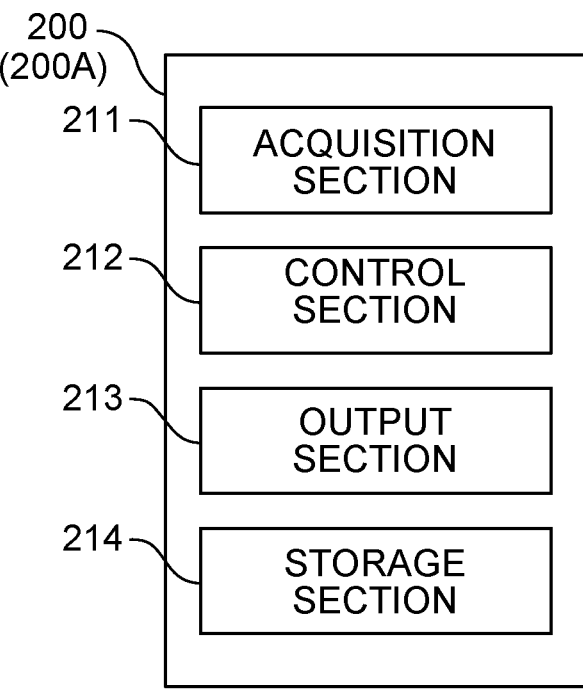
FIG. 5 is a block diagram illustrating an example of a functional configuration of an ECU.

FIG. 5 is a block diagram illustrating an example of a functional configuration of the ECU 200.

As illustrated in FIG. 5, the ECU 200 includes functional configuration of an acquisition section 211, a control section 212, an output section 213, and a storage section 214. Each of these functional configurations is implemented by the CPU 201 reading a program stored on the ROM 202 or the storage 204 and executing the program.

The acquisition section 211 acquires data from the onboard network ECU 10 and from other ECUs 200. More specifically, the acquisition section 211 acquires new software from the ECU 10 when an update of software to be executed by the ECU 200 has been produced.

The control section 212 controls operation of the ECU 200. More specifically, when an update has been produced for the software executed by the ECU 200, the control section 212 performs processing to update the software of the device itself with the new software acquired by the acquisition section 211. Moreover, in cases in which data has been received by the device itself that is either data not approved by the device itself or is data from an unexpected ECU 200, the control section 212 detects this as a communication abnormality, and notifies the ECU 10 of the communication abnormality detection.

The output section 213 outputs data to the onboard network ECU 10 or another ECU 200. The output of data from the output section 213 is performed under control from the control section 212.

The storage section 214 stores various information such as information for reference during operation of the ECU 10, and information employed to control the onboard network. More specifically, the storage section 214 stores software executed in the ECU 200 and data for reference by the software.

Next, description follows regarding operation of the communication system.

Figure 6:
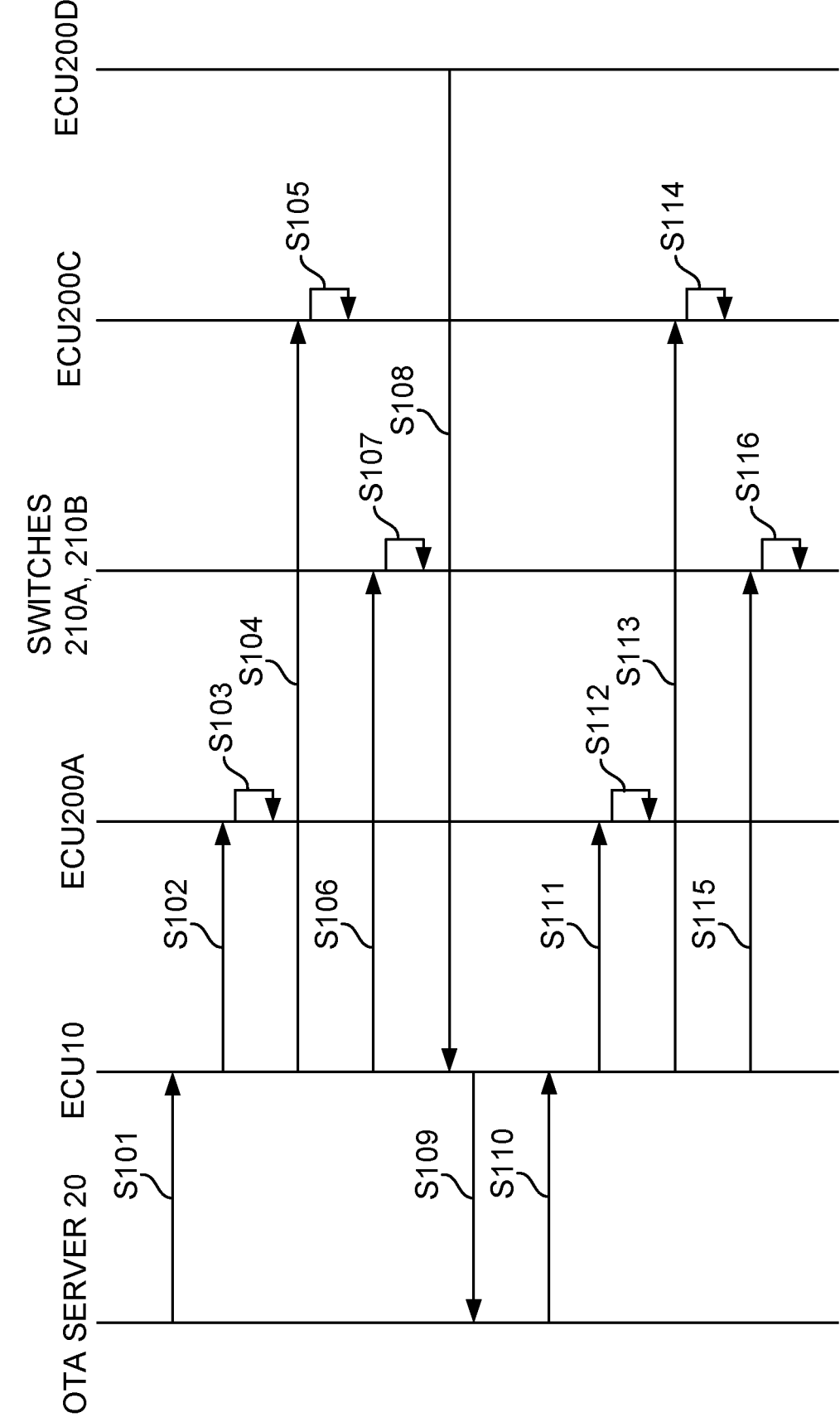
FIG. 6 is a sequence chart to explain an example of operation of each device of a communication system.

FIG. 6 is a sequence chart to explain an example of operation of each device of the communication system. In the ECU 10, the CPU 11 reads a communication control program from the ROM 12 or the storage 14, expands the program in the RAM 13, and executes the program so as to perform the communication control processing.

The sequence chart illustrated in FIG. 6 illustrates operation of each device for a case in which the software executed in the onboard network ECU 200 is updated, and the communication settings of the switches 210A, 210B are changed according to the software update. FIG. 6 is a sequence chart that envisages a case in which communication between the ECU 200A and the ECU 200C is blocked by the communication settings of the switches 210A, 210B prior to software update, and communication between the ECU 200A and the ECU 200C is started by the software update.

When updating the software executed by the onboard network ECU 200, first the OTA server 20 transmits the software data to the vehicle 1 at step S101. The software data transmitted from the OTA server 20 is first acquired by the ECU 10. The ECU 10 outputs the software data acquired from the OTA server 20 to the update target ECU(s) 200. In this case the ECUs 200A, 200B are the software update targets. At step S102 and step S104, the ECU 10 outputs the software data to the software update targets ECUs 200A, 200C. At step S103, the ECU 200A updates the software using the software data arriving from the ECU 10. Similarly, at step S105 the ECU 200C updates the software using the software data arriving from the ECU 10.

In order to update the communication settings of the switches 210A, 210B according to the software update, at step S106 the ECU 10 outputs new communication setting information. At step S107, the switches 210A, 210B use the communication setting information arriving from the ECU 10, and reflect this communication setting information in the communication settings. For example, by updating the software of the ECUs 200A, 200C, the ECU 10 updates the communication settings of the switches 210A, 210B so as to enable communication between the ECU 200A and the ECU 200C.

Communication between the ECU 200A and the ECU 200C is enabled by updating the communication settings of the switches 210A, 210B. However, in addition to the ECU 200C, the ECU 200D is also connected to the switch 210B. The ECU 200D anticipates communication with the ECU 10 and the ECU 200C connected to the same switch 210B, however, the ECU 200D does not anticipate communication with the ECUs 200A, 200B connected to the switch 210A. When the ECU 200A transmits data with no specified address using broadcast communication, the data not only arrives at the ECU 200C but also at the ECU 200D. The ECU 200D does not anticipate arrival of data sent from the ECU 200A and so detects this as a communication abnormality, and at step S108 notifies communication abnormality detection to the ECU 10.

When the ECU 10 has acquired notification of communication abnormality detection sent from the ECU 200D, at step S109 the ECU 10 transmits to the OTA server 20 notification that a communication abnormality has been generated as a result of the software update to the ECUs 200A, 200C and as a result of the changes to the communication settings of the switches 210A, 210B. When transmitting notification that a communication abnormality has occurred to the OTA server 20, the ECU 10 transmits this together with a reason code, which is information about the cause of the communication abnormality occurrence. The reason code information is information indicating which ECU the communication abnormality was from and the type of the communication abnormality. The content of the communication abnormality includes, more specifically, receipt of unknown data addressed to the device itself, detection of unknown data flowing through the onboard network, receipt of data at a cycle different to the cycle held by the device itself, receipt of data at a non-open port of the device itself, and the like.

The OTA server 20 that has received notification of communication abnormality occurrence then, at step S110, transmits a rollback instruction to the vehicle 1. The roll back referred to is a return to the software prior to update. When sent the rollback instruction from the OTA server 20, the ECUs 200A, 200C use the software data being held prior to update to return to the state prior to the software update.

On receipt of the rollback instruction from the OTA server 20, the ECU 10 outputs a rollback instruction to the rollback target ECUs 200. In this example the ECUs 200A, 200C are the software rollback targets. At step S111 and step S113, the ECU 10 outputs a rollback instruction to the software rollback targets ECUs 200A, 200C. At step S112, the ECU 200A rolls back the software according to the instruction from the ECU 10. Similarly, at step S114, the ECU 200C rolls back the software according to the instruction from the ECU 10. Moreover, as well as the software rollback, at step S115 the ECU 10 also instructs the switches 210A, 210B so as to return to the state prior to changing the communication settings. At step S116 the switches 210A, 210B are returned to the state prior to changing the communication settings.

On receiving a communication abnormality occurrence notification and reason code from the ECU 10, the OTA server 20 re-transmits software, modified based on the content of the reason code such that the communication abnormality does not occur, to the vehicle 1. The distribution target for the modified software is not limited to being the ECUs 200A, 200C, and may include the ECU 200D that notified the communication abnormality occurrence. The flow of processing from transmitting the software from the OTA server 20 to updating the software in the ECUs 200 is similar to that described above from step S101 to step S105, and so detailed explanation thereof will be omitted. The ECU 10 also executes processing to update the communication settings of the switches 210A, 210B according to the updated software.

As explained above, according to the exemplary embodiment of the present disclosure, the communication settings of the setting change target switches of the network can be returned to their state prior to change in cases in which an ECU on the network that is not a setting change target has detected a communication abnormality. The ECU 10 is able to achieve a state such that the ECU that is not a software update target does not detect a communication abnormality by returning the communication settings of the setting change target switches of the network to their state prior to change.

Although in the exemplary embodiment described above a case has been illustrated in which the OTA server 20 distributes software, in cases in which the OTA server 20 does not distribute software, when the ECU 10 has acquired a communication abnormality detection notification from an ECU 200, the onboard network ECU 10 executes processing to return the communication settings for the switches 210A, 210B to their state prior to change.

The present disclosure is also applicable to a case in which a new ECU is connected to an onboard network, and communication settings are changed to enable communication between the newly connected ECU and other ECUs. Moreover, although the example illustrated in the above exemplary embodiment was related to changing communication settings on an onboard network that is a network built up in a vehicle, the present disclosure is not limited to such an example. The present disclosure is also applicable to networks in general that have a configuration changed by software setting.

Note that the communication control processing executed by a CPU reading and executing software (a program) in the above exemplary embodiment, the communication control processing may be executed by various processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The communication control processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although in the above exemplary embodiment an embodiment was described in which a program for communication control processing was pre-stored (installed) on the ROM or the storage, there is no limitation thereto. The program may be provided in a format recorded on a non-transitory recording medium such as a compact disk read only memory (CD-ROM), digital versatile disk read only memory (DVD-ROM), universal serial bus (USB) memory, or the like. Moreover, the program may be provided in a format downloadable from an external device over a network.

An object of the present disclosure is to provide a communication control device that, in cases in which a communication device that is not the network setting change target has detected a communication abnormality, the non-change target communication device does not detect the communication abnormality, and to provide a communication control method and a non-transitory computer readable recording medium of the same.

A first aspect of the disclosure is a communication control device including a memory, and a processor coupled to the memory. The processor is configured to perform processing related to changing a network setting, on a communication device that is connected to the network and that is a setting change target, and perform processing to return the network setting to a prior state, on the communication device that is the setting change target, in a case in which a communication abnormality notification is received from a communication device that is connected to the network and that is not a setting change target.

The first aspect of the present disclosure enables a state to be achieved in which a non-change target communication device does not detect a communication abnormality by returning the network settings to the state prior to change when a communication abnormality has occurred.

A second aspect of the disclosure is the communication control device of the first aspect, wherein the processor is configured to determine a network setting change to be effective, in a case in which no communication abnormality notification has been received from the communication device that is not the setting change target for a specific period of time after changing the network setting on the communication device that is the setting change target.

The second aspect of the present disclosure enables network control that determines a network setting change to be effective in cases in which a communication abnormality was not detected after changing the network setting.

A third aspect of the disclosure is the communication control device of the second aspect, wherein the processor is configured to notify an external device that the changing of the network setting is effective.

The third aspect of the present disclosure enables an external device to be made aware that a network setting change was effective.

A fourth aspect of the disclosure is the communication control device of the first aspect, wherein the processor is configured to perform processing to return the network setting to the prior state on the communication device that is the setting change target that caused the communication abnormality notification from the communication device that is not the setting change target.

The fourth aspect of the present disclosure enables a range for returning network settings to a state prior to change to be minimized.

A fifth aspect of the disclosure is the communication control device of the first aspect, wherein a communication abnormality is at least one communication abnormality selected from the group consisting of receipt of unknown data addressed to the communication device that is not the setting change target, flow of unknown data through the network, receipt of data at a cycle different from a cycle held by the communication device that is not the setting change target, and receipt of data at a non-open port of the communication device that is not the setting change target.

The fifth aspect of the present disclosure enables the receipt of specific data to be determined as a communication abnormality.

A sixth aspect of the disclosures is the communication control device of the first aspect, wherein the processor is configured to request a server that distributed software causing changing of the network setting to return the software to a state prior to update.

The sixth aspect of the present disclosure enables software to be rolled back to a state in which communication abnormalities do no occur.

A seventh aspect of the disclosure is the communication control device of the first aspect, wherein the processor is configured to periodically monitor a presence or absence of a notification of communication abnormality from communication devices connected to the network, and perform processing on the communication device that is the setting change target to return the network setting to the prior state according to detection of a communication abnormality notification.

The seventh aspect of the present disclosure monitors for the occurrence of communication abnormalities, and as a result of such monitoring is able to return the network setting to the state prior to change when a communication abnormality occurs.

An eighth aspect of the disclosure is the communication control device of the first aspect, wherein the network is an onboard network.

The eighth aspect of the present disclosure enables the network setting to be returned to the state prior to change when a communication abnormality occurs in a communication device connected to an onboard network.

A ninth aspect of the disclosure is a communication control method including, by a processor performing processing related to changing a network setting, on a communication device that is connected to the network and that is a setting change target, and performing processing to return the network setting to a prior state, on the communication device that is the setting change target, in a case in which a communication abnormality notification is received from a communication device that is connected to the network and that is not a setting change target.

The ninth aspect of the present disclosure enables a state to be achieved in which a communication abnormality is not being detected by a non-change target communication device by returning the network setting to the state prior to change when a communication abnormality has occurred.

A tenth aspect of the disclosure is a non-transitory recording medium storing a program that is executable by a computer to perform processing, the processing including performing processing related to changing a network setting, on a communication device that is connected to the network and that is a setting change target, and performing processing to return the network setting to a prior state, on the communication device that is the setting change target, in a case in which a communication abnormality notification is received from a communication device that is connected to the network and that is not a setting change target.

The tenth aspect of the present disclosure enables a state to be achieved in which a communication abnormality is not being detected by a non-change target communication device by returning the network setting to the state prior to change when a communication abnormality has occurred.

The present disclosure enables, in a case in which a communication abnormality has been detected by a communication device that is not a change target for network setting, a state to be achieved in which a communication abnormality is not being detected by the non-change target communication device by returning the devices that are the target for network setting change to their setting prior to change.

What is claimed is:

1. A communication control device comprising
a memory; and
a processor coupled to the memory, the processor being
  configured to:
perform processing related to changing a network setting,
  on a first communication device that is connected to a
  network and that is a setting change target, wherein
  changing the network setting includes at least one of
  setting to open or close a port, setting to prioritize
  passage of a packet, setting a size of a packet queue,
  setting a bandwidth, or setting packet filtering;
perform processing to return the network setting to a prior
  state, on the first communication device that is the
  setting change target, in a case in which a notification
  of a communication abnormality is received from a
  second communication device that is connected to the
  network and that is not a setting change target;
revise, based on information relating to the communica-
  tion abnormality, a content of the processing to change
  the network setting;
perform the revised processing to change the network
  setting for the first communication device; and
determine a network setting change to be effective, in a
  case in which no notification of a communication
  abnormality has been received from the second com-
  munication device that is not the setting change target
  for a specific period of time after changing the network
  setting on the first communication device that is the
  setting change target.

2. The communication control device of claim 1, wherein the processor is further configured to notify an external device that the changing of the network setting is effective.

3. The communication control device of claim 1, wherein the processor is further configured to perform processing to return the network setting to the prior state on the first communication device that is the setting change target that caused the notification of the communication abnormality from the second communication device that is not the setting change target.

4. The communication control device of claim 1, wherein the communication abnormality is at least one communica-tion abnormality selected from the group consisting of receipt of unknown data addressed to the second commu-nication device that is not the setting change target, flow of unknown data through the network, receipt of data at a cycle different from a cycle held by the second communication device that is not the setting change target, and receipt of data at a non-open port of the second communication device that is not the setting change target.

5. The communication control device of claim 1, wherein the processor is configured to request a server that distrib-uted software causing changing of the network setting to return the software to a state prior to update.

6. The communication control device of claim 1, wherein the processor is further configured to:
periodically monitor a presence or absence of a notifica-
  tion of a communication abnormality from communi-
  cation devices connected to the network; and
perform processing on the first communication device that
  is the setting change target to return the network setting
  to the prior state according to detection of the notifi-
  cation of the communication abnormality.

7. The communication control device of claim 1, wherein the network is an onboard network.

8. The communication control device of claim 1, wherein the revised processing to change the network setting targets the second communication device in addition to the first communication device.

9. A communication control method comprising, by a processor:
performing processing related to changing a network
  setting, on a first communication device that is con-
  nected to a network and that is a setting change target,
  wherein changing the network setting includes at least
  one of setting to open or close a port, setting to
  prioritize passage of a packet, setting a size of a packet
  queue, setting a bandwidth, or setting packet filtering;
performing processing to return the network setting to a
  prior state, on the first communication device that is the
  setting change target, in a case in which a notification
  of a communication abnormality is received from a
  second communication device that is connected to the
  network and that is not a setting change target;
revising, based on information relating to the communi-
  cation abnormality, a content of the processing to
  change the network setting;
performing the revised processing to change the network
  setting for the first communication device; and
determining a network setting change to be effective, in a
  case in which no notification of a communication
  abnormality has been received from the second com-
  munication device that is not the setting change target
  for a specific period of time after changing the network
  setting on the first communication device that is the
  setting change target.

10. A non-transitory recording medium storing a program that is executable by a computer to perform processing, the processing comprising:

performing processing related to changing a network
setting, on a first communication device that is con-
nected to a network and that is a setting change target,
wherein changing the network setting includes at least
one of setting to open or close a port, setting to
prioritize passage of a packet, setting a size of a packet
queue, setting a bandwidth, or setting packet filtering;
performing processing to return the network setting to a
prior state, on the first communication device that is the
setting change target, in a case in which a notification
of a communication abnormality is received from a
second communication device that is connected to the
network and that is not a setting change target;
revising, based on information relating to the communi-
cation abnormality, a content of the processing to
change the network setting;
performing the revised processing to change the network
setting for the first communication device; and
determining a network setting change to be effective, in a
case in which no notification of a communication
abnormality has been received from the second com-
munication device that is not the setting change target
for a specific period of time after changing the network
setting on the first communication device that is the
setting change target.

* * * * *

14